US009025264B1

(12) United States Patent
Desai et al.

(10) Patent No.: US 9,025,264 B1
(45) Date of Patent: May 5, 2015

(54) METHODS FOR MEASURING MEDIA PERFORMANCE ASSOCIATED WITH ADJACENT TRACK INTERFERENCE

(71) Applicant: WD Media, LLC, San Jose, CA (US)

(72) Inventors: Mrugesh Desai, San Jose, CA (US); Harold H. Gee, San Jose, CA (US); Mark A. Nichols, San Jose, CA (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 14/228,553

(22) Filed: Mar. 28, 2014

Related U.S. Application Data

(62) Division of application No. 13/045,416, filed on Mar. 10, 2011, now Pat. No. 8,711,499.

(51) Int. Cl.
  *G11B 27/36* (2006.01)
  *G11B 20/10* (2006.01)

(52) U.S. Cl.
  CPC .......... *G11B 27/36* (2013.01); *G11B 20/10453* (2013.01)

(58) Field of Classification Search
  None
  See application file for complete search history.

(56) References Cited

U.S. PATENT DOCUMENTS

| | | | |
|---|---|---|---|
| 5,600,500 A | 2/1997 | Madsen et al. |
| 5,691,857 A | 11/1997 | Fitzpatrick et al. |
| 6,013,161 A | 1/2000 | Chen et al. |
| 6,063,248 A | 5/2000 | Bourez et al. |
| 6,068,891 A | 5/2000 | O'Dell et al. |
| 6,086,730 A | 7/2000 | Liu et al. |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |
| 6,143,375 A | 11/2000 | Ross et al. |
| 6,145,849 A | 11/2000 | Bae et al. |
| 6,146,737 A | 11/2000 | Malhotra et al. |
| 6,149,696 A | 11/2000 | Jia |
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,200,441 B1 | 3/2001 | Gornicki et al. |
| 6,204,995 B1 | 3/2001 | Hokkyo et al. |
| 6,206,765 B1 | 3/2001 | Sanders et al. |

(Continued)

OTHER PUBLICATIONS

Alexander Taratorin, "Characterization of Magnetic Recording Systems: A practical Approach", Guzik Technical Enterprises, ch.4, 1996.

(Continued)

*Primary Examiner* — Dismery Mercedes

(57) ABSTRACT

Methods for measuring media performance associated with adjacent track interference are provided. One such method includes iteratively writing data to a target track for each of a plurality of n frequencies, measuring a first signal amplitude and a first noise for each of the n sectors on the target track, writing an aggressor track pattern proximate the target track, measuring a second signal amplitude and a second noise for each of the n sectors on the target track, calculating a weighted sum for each of the signal amplitude measurements for each of the plurality of n frequencies, and calculating a weighted sum for each of the noise measurements for each of the plurality of n frequencies, and repeating the writing the aggressor track pattern, the measuring the second signal amplitude and the second noise, and calculating the weighted sums for preselected numbers of times.

15 Claims, 5 Drawing Sheets

(56) References Cited

U.S. PATENT DOCUMENTS

| | | | |
|---|---|---|---|
| 6,210,819 B1 | 4/2001 | Lal et al. | |
| 6,216,709 B1 | 4/2001 | Fung et al. | |
| 6,221,119 B1 | 4/2001 | Homola | |
| 6,248,395 B1 | 6/2001 | Homola et al. | |
| 6,261,681 B1 | 7/2001 | Suekane et al. | |
| 6,265,868 B1 * | 7/2001 | Richter | 324/212 |
| 6,270,885 B1 | 8/2001 | Hokkyo et al. | |
| 6,274,063 B1 | 8/2001 | Li et al. | |
| 6,283,838 B1 | 9/2001 | Blake et al. | |
| 6,287,429 B1 | 9/2001 | Moroishi et al. | |
| 6,290,573 B1 | 9/2001 | Suzuki | |
| 6,299,947 B1 | 10/2001 | Suzuki et al. | |
| 6,303,217 B1 | 10/2001 | Malhotra et al. | |
| 6,309,765 B1 | 10/2001 | Suekane et al. | |
| 6,358,636 B1 | 3/2002 | Yang et al. | |
| 6,362,452 B1 | 3/2002 | Suzuki et al. | |
| 6,363,599 B1 | 4/2002 | Bajorek | |
| 6,365,012 B1 | 4/2002 | Sato et al. | |
| 6,381,090 B1 | 4/2002 | Suzuki et al. | |
| 6,381,092 B1 | 4/2002 | Suzuki | |
| 6,387,483 B1 | 5/2002 | Hokkyo et al. | |
| 6,391,213 B1 | 5/2002 | Homola | |
| 6,395,349 B1 | 5/2002 | Salamon | |
| 6,403,919 B1 | 6/2002 | Salamon | |
| 6,408,677 B1 | 6/2002 | Suzuki | |
| 6,426,157 B1 | 7/2002 | Hokkyo et al. | |
| 6,429,984 B1 | 8/2002 | Alex | |
| 6,482,330 B1 | 11/2002 | Bajorek | |
| 6,482,505 B1 | 11/2002 | Bertero et al. | |
| 6,500,567 B1 | 12/2002 | Bertero et al. | |
| 6,528,124 B1 | 3/2003 | Nguyen | |
| 6,548,821 B1 | 4/2003 | Treves et al. | |
| 6,552,871 B2 | 4/2003 | Suzuki et al. | |
| 6,565,719 B1 | 5/2003 | Lairson et al. | |
| 6,566,674 B1 | 5/2003 | Treves et al. | |
| 6,570,378 B2 * | 5/2003 | Goh et al. | 324/212 |
| 6,571,806 B1 | 6/2003 | Rosano et al. | |
| 6,628,466 B2 | 9/2003 | Alex | |
| 6,664,503 B1 | 12/2003 | Hsieh et al. | |
| 6,670,055 B2 | 12/2003 | Tomiyasu et al. | |
| 6,682,807 B2 | 1/2004 | Lairson et al. | |
| 6,683,754 B2 | 1/2004 | Suzuki et al. | |
| 6,730,420 B1 | 5/2004 | Bertero et al. | |
| 6,743,528 B2 | 6/2004 | Suekane et al. | |
| 6,759,138 B2 | 7/2004 | Tomiyasu et al. | |
| 6,778,353 B1 | 8/2004 | Harper | |
| 6,795,274 B1 | 9/2004 | Hsieh et al. | |
| 6,855,232 B2 | 2/2005 | Jairson et al. | |
| 6,857,937 B2 | 2/2005 | Bajorek | |
| 6,877,116 B1 | 4/2005 | Kost et al. | |
| 6,893,748 B2 | 5/2005 | Bertero et al. | |
| 6,899,959 B2 | 5/2005 | Bertero et al. | |
| 6,909,566 B1 * | 6/2005 | Zaitsu et al. | 360/31 |
| 6,916,558 B2 | 7/2005 | Umezawa et al. | |
| 6,939,120 B1 | 9/2005 | Harper | |
| 6,946,191 B2 | 9/2005 | Morikawa et al. | |
| 6,947,234 B2 * | 9/2005 | Lamberts et al. | 360/53 |
| 6,967,798 B2 | 11/2005 | Homola et al. | |
| 6,972,135 B2 | 12/2005 | Homola | |
| 6,975,475 B2 | 12/2005 | Lee et al. | |
| 7,004,827 B1 | 2/2006 | Suzuki et al. | |
| 7,006,323 B1 | 2/2006 | Suzuki | |
| 7,016,154 B2 | 3/2006 | Nishihira | |
| 7,019,924 B2 | 3/2006 | McNeil et al. | |
| 7,045,215 B2 | 5/2006 | Shimokawa | |
| 7,070,870 B2 | 7/2006 | Bertero et al. | |
| 7,090,934 B2 | 8/2006 | Hokkyo et al. | |
| 7,095,576 B2 | 8/2006 | Kim et al. | |
| 7,099,112 B1 | 8/2006 | Harper | |
| 7,105,241 B2 | 9/2006 | Shimokawa et al. | |
| 7,119,990 B2 | 10/2006 | Bajorek et al. | |
| 7,147,790 B2 | 12/2006 | Wachenschwanz et al. | |
| 7,161,753 B2 | 1/2007 | Wachenschwanz et al. | |
| 7,166,319 B2 | 1/2007 | Ishiyama | |
| 7,166,374 B2 | 1/2007 | Suekane et al. | |
| 7,169,487 B2 | 1/2007 | Kawai et al. | |
| 7,170,700 B1 * | 1/2007 | Lin et al. | 360/31 |
| 7,174,775 B2 | 2/2007 | Ishiyama | |
| 7,179,549 B2 | 2/2007 | Malhotra et al. | |
| 7,184,139 B2 | 2/2007 | Treves et al. | |
| 7,196,860 B2 | 3/2007 | Alex | |
| 7,199,977 B2 | 4/2007 | Suzuki et al. | |
| 7,208,236 B2 | 4/2007 | Morikawa et al. | |
| 7,220,500 B1 | 5/2007 | Tomiyasu et al. | |
| 7,227,708 B2 * | 6/2007 | Feng | 360/31 |
| 7,229,266 B2 | 6/2007 | Harper | |
| 7,239,970 B2 | 7/2007 | Treves et al. | |
| 7,252,897 B2 | 8/2007 | Shimokawa et al. | |
| 7,277,254 B2 | 10/2007 | Shimokawa et al. | |
| 7,281,920 B2 | 10/2007 | Homola et al. | |
| 7,292,329 B2 | 11/2007 | Treves et al. | |
| 7,301,726 B1 | 11/2007 | Suzuki | |
| 7,302,148 B2 | 11/2007 | Treves et al. | |
| 7,305,119 B2 | 12/2007 | Treves et al. | |
| 7,314,404 B2 | 1/2008 | Singh et al. | |
| 7,320,584 B1 | 1/2008 | Harper et al. | |
| 7,329,114 B2 | 2/2008 | Harper et al. | |
| 7,375,362 B2 | 5/2008 | Treves et al. | |
| 7,420,886 B2 | 9/2008 | Tomiyasu et al. | |
| 7,425,719 B2 | 9/2008 | Treves et al. | |
| 7,471,484 B2 | 12/2008 | Wachenschwanz et al. | |
| 7,498,062 B2 | 3/2009 | Calcaterra et al. | |
| 7,531,485 B2 | 5/2009 | Hara et al. | |
| 7,537,846 B2 | 5/2009 | Ishiyama et al. | |
| 7,549,209 B2 | 6/2009 | Wachenschwanz et al. | |
| 7,567,397 B2 | 7/2009 | Lu | |
| 7,569,490 B2 | 8/2009 | Staud | |
| 7,597,792 B2 | 10/2009 | Homola et al. | |
| 7,597,973 B2 | 10/2009 | Ishiyama | |
| 7,608,193 B2 | 10/2009 | Wachenschwanz et al. | |
| 7,632,087 B2 | 12/2009 | Homola | |
| 7,656,615 B2 | 2/2010 | Wachenschwanz et al. | |
| 7,682,546 B2 | 3/2010 | Harper | |
| 7,684,152 B2 | 3/2010 | Suzuki et al. | |
| 7,686,606 B2 | 3/2010 | Harper et al. | |
| 7,686,991 B2 | 3/2010 | Harper | |
| 7,695,833 B2 | 4/2010 | Ishiyama | |
| 7,706,096 B2 | 4/2010 | Ito et al. | |
| 7,722,968 B2 | 5/2010 | Ishiyama | |
| 7,729,071 B2 * | 6/2010 | Harada | 360/39 |
| 7,733,605 B2 | 6/2010 | Suzuki et al. | |
| 7,736,768 B2 | 6/2010 | Ishiyama | |
| 7,738,208 B2 * | 6/2010 | Kim et al. | 360/60 |
| 7,747,907 B2 | 6/2010 | Olds et al. | |
| 7,755,861 B1 | 7/2010 | Li et al. | |
| 7,758,732 B1 | 7/2010 | Calcaterra et al. | |
| 7,768,729 B2 * | 8/2010 | Moser et al. | 360/31 |
| 7,833,639 B2 | 11/2010 | Sonobe et al. | |
| 7,833,641 B2 | 11/2010 | Tomiyasu et al. | |
| 7,910,159 B2 | 3/2011 | Jung | |
| 7,911,736 B2 | 3/2011 | Bajorek | |
| 7,924,519 B2 | 4/2011 | Lambert | |
| 7,944,165 B2 | 5/2011 | O'Dell | |
| 7,944,643 B1 | 5/2011 | Jiang et al. | |
| 7,955,723 B2 | 6/2011 | Umezawa et al. | |
| 7,982,989 B1 | 7/2011 | Shi et al. | |
| 7,983,003 B2 | 7/2011 | Sonobe et al. | |
| 7,993,497 B2 | 8/2011 | Moroishi et al. | |
| 7,993,765 B2 | 8/2011 | Kim et al. | |
| 7,998,912 B2 | 8/2011 | Chen et al. | |
| 8,002,901 B1 | 8/2011 | Chen et al. | |
| 8,003,237 B2 | 8/2011 | Sonobe et al. | |
| 8,012,920 B2 | 9/2011 | Shimokawa | |
| 8,038,863 B2 | 10/2011 | Homola | |
| 8,057,926 B2 | 11/2011 | Ayama et al. | |
| 8,062,778 B2 | 11/2011 | Suzuki et al. | |
| 8,064,156 B1 | 11/2011 | Suzuki et al. | |
| 8,076,013 B2 | 12/2011 | Sonobe et al. | |
| 8,092,931 B2 | 1/2012 | Ishiyama et al. | |
| 8,094,401 B1 * | 1/2012 | Peng et al. | 360/66 |
| 8,100,685 B1 | 1/2012 | Harper et al. | |
| 8,101,054 B2 | 1/2012 | Chen et al. | |
| 8,102,613 B2 | 1/2012 | Duan et al. | |
| 8,125,723 B1 * | 2/2012 | Nichols et al. | 360/31 |

(56) References Cited

U.S. PATENT DOCUMENTS

| | | |
|---|---|---|
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,300,339 B1 * | 10/2012 | Nangare et al. ............... 360/39 |
| 8,309,239 B2 | 11/2012 | Umezawa et al. |
| 8,316,668 B1 | 11/2012 | Chan et al. |
| 8,331,053 B2 | 12/2012 | Hobbet |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B1 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,638,513 B1 * | 1/2014 | Burd ............... 360/39 |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,711,499 B1 | 4/2014 | Desai et al. |
| 2002/0060883 A1 | 5/2002 | Suzuki |
| 2003/0022024 A1 | 1/2003 | Wachenschwanz |
| 2003/0081338 A1 | 5/2003 | Wang et al. |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0066971 A1 | 3/2006 | Alex et al. |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0245909 A1 | 10/2007 | Homola |
| 2008/0075845 A1 | 3/2008 | Sonobe et al. |
| 2008/0093760 A1 | 4/2008 | Harper et al. |
| 2008/0151704 A1 * | 6/2008 | Harada ............... 369/30.22 |
| 2008/0189469 A1 | 8/2008 | Mettler et al. |
| 2008/0198492 A1 * | 8/2008 | Ahn ............... 360/31 |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0075286 A1 | 3/2011 | Duan et al. |
| 2011/0075290 A1 * | 3/2011 | Hobbet ............... 360/55 |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |

(56) References Cited

U.S. PATENT DOCUMENTS

| | | |
|---|---|---|
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez; Allen J. |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |

OTHER PUBLICATIONS

A. Van Herk, "Side Fringing Fields and Write and Read Crosstalk of Narrow Magnetic Recording Heads", IEEE Transsactions on Magnetics, vol. Mag-13, No. 4, pp. 1021-1028, Jul. 1977.

A. Van Herk, et al., "Measurement of Side-Write, -Erase, and -Read Behavior of Conventional Narrow Track Disk Heads", IEEE Transsactions on Magnetics, vol. Mag-16, No. 1, pp. 114-119, Jan. 1980.

Non-Final Office Action dated Jun. 5, 2013 from U.S. Appl. No. 13/045,416, 22 pages.

Notice of Allowance dated Dec. 18, 2013 from U.S. Appl. No. 13/045,416, 10 pages.

\* cited by examiner

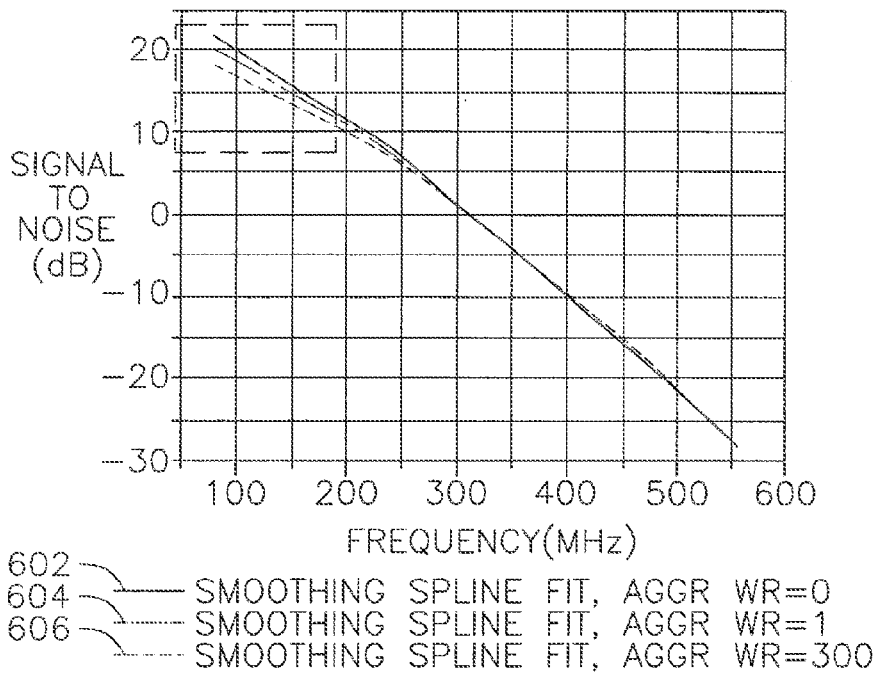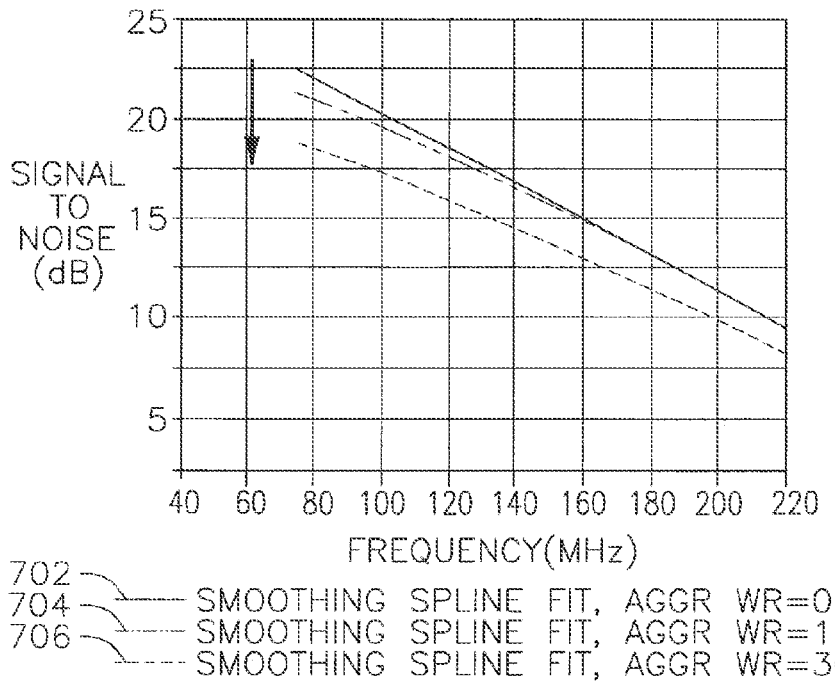

METHODS FOR MEASURING MEDIA PERFORMANCE ASSOCIATED WITH ADJACENT TRACK INTERFERENCE

CROSS REFERENCE TO RELATED APPLICATION

This application is a divisional of U.S. patent application Ser. No. 13/045,416, filed on Mar. 10, 2011, which is hereby incorporated by reference in its entirety.

FIELD

The present invention relates to magnetic media used in information storage devices, and more specifically to methods for measuring media performance associated with adjacent track interference.

BACKGROUND

Information storage devices commonly include magnetic media in the form of multiple magnetic disks for storing information. The optimization of the magnetic media for such information storage devices is a tradeoff relating to many competing design constraints. In particular, many media parameters improve when the media is made magnetically "softer" resulting in wider written tracks. However, this degrades the performance in the drive when data are written on adjacent tracks and some of the on-track information is degraded because the track is too wide. There are several measurements that assess the impact of writing on adjacent tracks, including, for example, squeeze measurements, adjacent track interference signal to noise ratio (ATI-SNR) measurements, and error rate final measurements. However, these measurement techniques commonly offer little or no insight into how the adjacent track writes are impacting the original data.

SUMMARY

Aspects of the invention relate to methods for measuring media performance associated with adjacent track interference. In one embodiment, the invention relates to a method for measuring performance associated with adjacent track interference on a magnetic disk media for a storage device, the method including iteratively writing data to a target track for each of a plurality of n frequencies, where iteratively writing data for an nth iteration includes writing an nth sector of the target track on the disk with an nth pattern at an nth frequency, measuring a first signal amplitude and a first noise for each of the n sectors on the target track, writing an aggressor track pattern proximate the target track, measuring a second signal amplitude and a second noise for each of the n sectors on the target track, calculating a weighted sum for each of the first and second signal amplitude measurements for each of the plurality of n frequencies, calculating a weighted sum for each of the first and second noise measurements for each of the plurality of n frequencies, repeating the writing the aggressor track pattern proximate the target track for a predetermined number of times to generate cumulative measurements, repeating the measuring the second signal amplitude and the second noise for each of the n sectors on the target track, and repeating the calculating the weighted sum for each of the first and second signal amplitude measurements and the calculating the weighted sum for each of the first and second noise measurements using the cumulative measurements to generate adjacent track interference performance information.

In another embodiment, the invention relates to a method for measuring performance associated with adjacent track interference on a magnetic disk media for a storage device, the method including iteratively measuring a first signal amplitude and a first noise at a target track for each of a plurality of n frequencies, where the iteratively measuring the first signal amplitude and the first noise for an nth iteration includes writing a circumferential target track on the disk with an nth pattern at an nth frequency, measuring a first signal amplitude and a first noise at the target track, and erasing the nth pattern, iteratively measuring a second signal amplitude and a second noise at a target track for each of the plurality of n frequencies, where iteratively measuring the second signal amplitude and the second noise for an nth iteration includes writing a second circumferential target track on the disk with an nth pattern at an nth frequency, writing, repeatedly for a preselected number of times, an aggressor track pattern proximate the second target track, measuring a second signal amplitude and a second noise at the second target track, and erasing the nth pattern, calculating a weighted sum of the first signal amplitude measurements and the second signal amplitude measurements for each of the plurality of n frequencies, calculating a weighted sum of the first noise measurements and the second noise measurements for each of the plurality of n frequencies, and using the calculated weighted sum of the first and the second signal amplitude measurements and the calculated weighted sum of the first and the second noise measurements to generate adjacent track interference performance information.

In yet another embodiment, the invention relates to a method for measuring performance associated with adjacent track interference on a magnetic disk media for a storage device, the method including (a) writing a circumferential target track on the disk with a nth pattern at an nth frequency, (b) measuring a first signal amplitude and a first noise at the target track, (c) writing, repeatedly for a preselected number of times, an aggressor track pattern proximate the target track, (d) measuring a second signal amplitude and a second noise at the target track, (e) erasing the nth pattern, (f) repeating (a)-(e) n times, (g) calculating a weighted sum of the first signal amplitude measurements and the second signal amplitude measurements for each nth frequency, and (h) calculating a weighted sum of the first noise measurements and the second noise measurements for each nth frequency.

BRIEF DESCRIPTION OF THE DRAWINGS

FIG. 6 is a graph of a calculated signal to noise ratio (SNR) versus frequency illustrating media performance for zero aggressive writes, 1 aggressive write, and 300 aggressive writes in accordance with one embodiment of the invention.

FIG. 7 is an expanded view of a portion of the graph of FIG. 6 illustrating an extent of damage caused by adjacent track interference in accordance with one embodiment of the invention.

DETAILED DESCRIPTION

Figure 1:
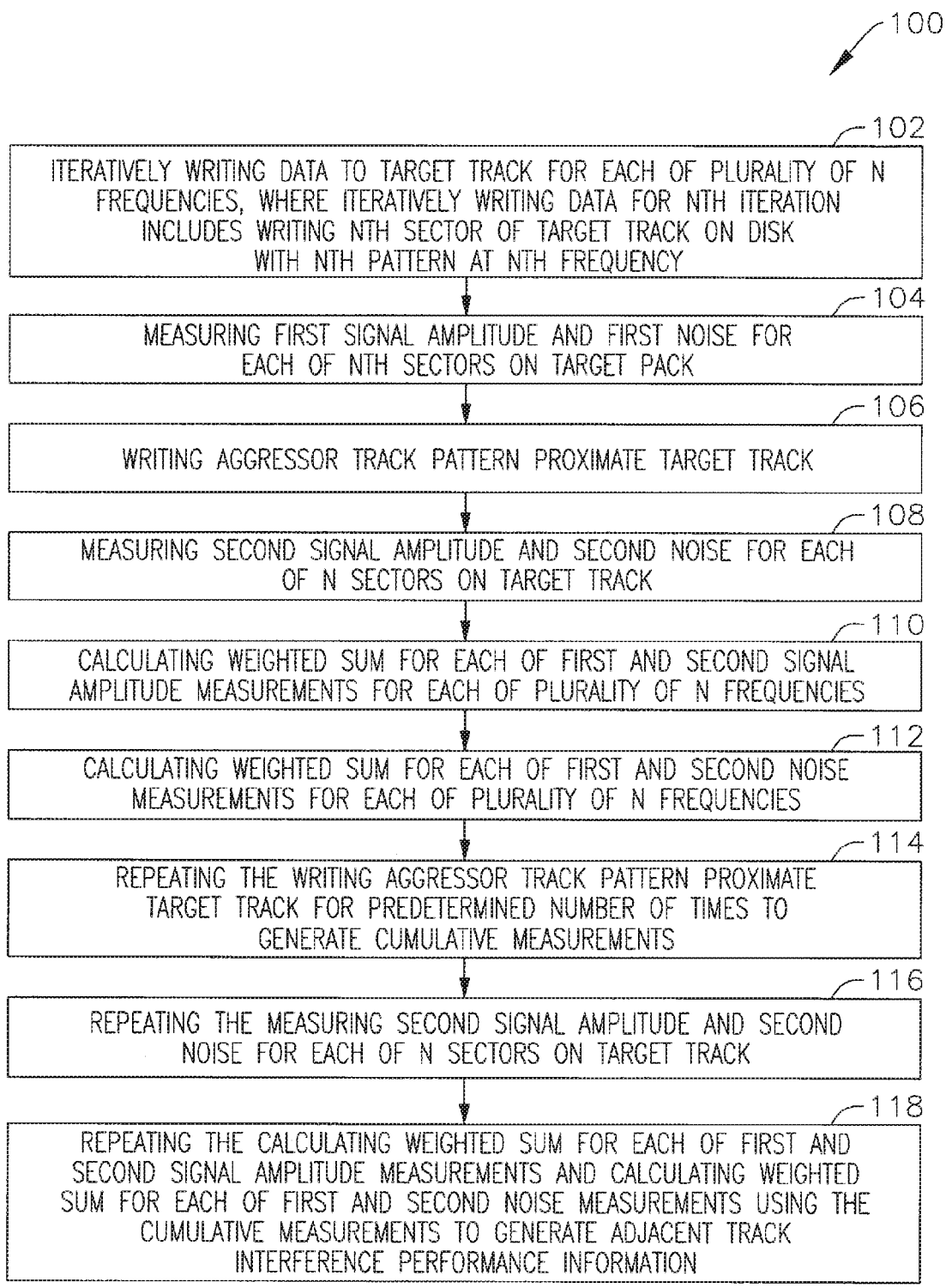
FIG. 1 is a flow chart of a process for measuring performance characteristics associated with adjacent track interference (e.g., by one or more aggressor writes) for a single target track of a magnetic disk media, where the process calculates weighted sums of the performance characteristics at multiple frequencies in accordance with one embodiment of the invention.

Referring now to the drawings, embodiments of processes for measuring performance characteristics associated with adjacent track interference on magnetic disk media are illustrated. The processes write data to the magnetic media at a preselected number of frequencies and then make signal and noise measurements before and after one or more adjacent writes proximate to the data (e.g., aggressor write). The processes can write the data and take signal and noise measurements for the preselected number of frequencies. The processes can also repeat the aggressor writes a preselected number of times. The processes then calculate weighted sums of the signal and noise measurements. The calculated information can be used to make improvements in the magnetic media or processes associated with use of the magnetic media.

In some embodiments, the processes write data to a preselected number of circumferential tracks at the preselected frequencies and measure the adjacent track interference associated therewith. In other embodiments, the processes write data to sectors of a single circumferential track at the preselected frequencies and measure the adjacent track interference associated therewith.

FIG. 1 is a flow chart of a process 100 for measuring performance characteristics associated with adjacent track interference (e.g., by one or more aggressor writes) for a single target track of a magnetic disk media, where the process calculates weighted sums of the performance characteristics at multiple frequencies in accordance with one embodiment of the invention. The process begins by iteratively writing (102) data to a target track for each of a plurality of n frequencies, where the iteratively writing data for an nth iteration includes writing an nth sector of the target track on the disk with an nth pattern at an nth frequency. In several embodiments, n is a positive integer indicative of a number of frequencies at which the process writes data. In one embodiment, n is 6. In one embodiment, the process also repeats the iteratively writing to the target track for a preselected number of times with additional sectors until the target track is about full. In one embodiment, the target track includes about 128 sectors. In one embodiment, the preselected number of times for writing with the additional sectors is about 20 or greater than 20.

The process continues by measuring (104) a first signal amplitude and a first noise for each of the n sectors on the target track. The process then writes (106) an aggressor track pattern proximate the target track. In some embodiments, the process writes the aggressor track pattern on one side of the target track. In other embodiments, the process writes the aggressor track pattern on both an inner side and an outer side of the target track. The process then measures (108) a second signal amplitude and a second noise for each of the n sectors on the target track. In one embodiment, the process measures the first and second signal amplitude and the first and second noise at the target track for each sector by measuring the first and second signal amplitude and the first and second noise for each of the sectors written at the nth frequency.

The process then calculates (110) a weighted sum for each of the first and second signal amplitude measurements for each of the plurality of n frequencies. In some embodiments, the number of frequencies is 6. In one such case, the frequencies are multiples of one another. For example, a first frequency is 1 multiplied by a period (T) for the highest frequency for the preselected location of the target track on the disk. In such case, the other frequencies are 2T, 3T, 4T, 5T and 6T, where each of these additional frequencies are lower than the 1T frequency. In one embodiment, the weights for the various weighted sum calculations can be given to the 6 frequencies in accordance with the table listed below.

| Frequency | Weight |
| --- | --- |
| 1T | 0.25 |
| 2T | 0.25 |
| 3T | 0.1875 |
| 4T | 0.125 |
| 5T | 0.071825 |
| 6T | 0.046875 |

The process then calculates (112) a weighted sum for each of the first and second noise measurements for each of the plurality of n frequencies. In one embodiment, the process applies the weights listed in the table above to the noise measurements for each of 6 frequencies. The process repeats (114) the writing the aggressor track pattern proximate the target track for a predetermined number of times to generate cumulative measurements. In one embodiment, the predetermined number of times is 299 thereby resulting in a total of 300 aggressor writes. The process then repeats (116) the measuring the second signal amplitude and the second noise for each of the n sectors on the target track. In one case, measurements have therefore been made before any aggressor writes, after 1 aggressor write, and after 300 aggressor writes. The process repeats (118) the calculating the weighted sum for each of the first and second signal amplitude measurements and the calculating the weighted sum for each of the first and second noise measurements using the cumulative measurements to generate adjacent track interference performance information. In several embodiments, the process calculates differences in successive signal and noise measurements to generate the adjacent track interference performance information. In some embodiments, the process considers the cumulative measurements and subsequently performs analysis of more specific data measured at particular frequencies during the process for a more comprehensive media performance analysis.

In several embodiments, the adjacent track interference performance information is used to make improvements in the magnetic media or processes associated with use of the magnetic media. In some embodiments, the adjacent track interference performance information can be used to in place of other conventional measurements of error. In several embodiments, the adjacent track interference performance information provides more information than the information provided by conventional error measurement techniques.

In one embodiment, the target track is a circumferential track extending around the disk at a preselected radius. In one embodiment, the target track is about circular.

In one embodiment, the process can perform the sequence of actions in a different order. In another embodiment, the process can skip one or more of the actions. In other embodiments, one or more of the actions are performed simultaneously. In some embodiments, additional actions can be performed.

In some embodiments, the process can be performed using a test assembly for testing magnetic storage drives. In one such embodiment, the test assembly includes a model referred to as a Guzik Spinstand V2002 along with a sub-test assembly model RWA2002 made by Guzik Technical Enterprises of Mountain View, Calif.

Figure 2:
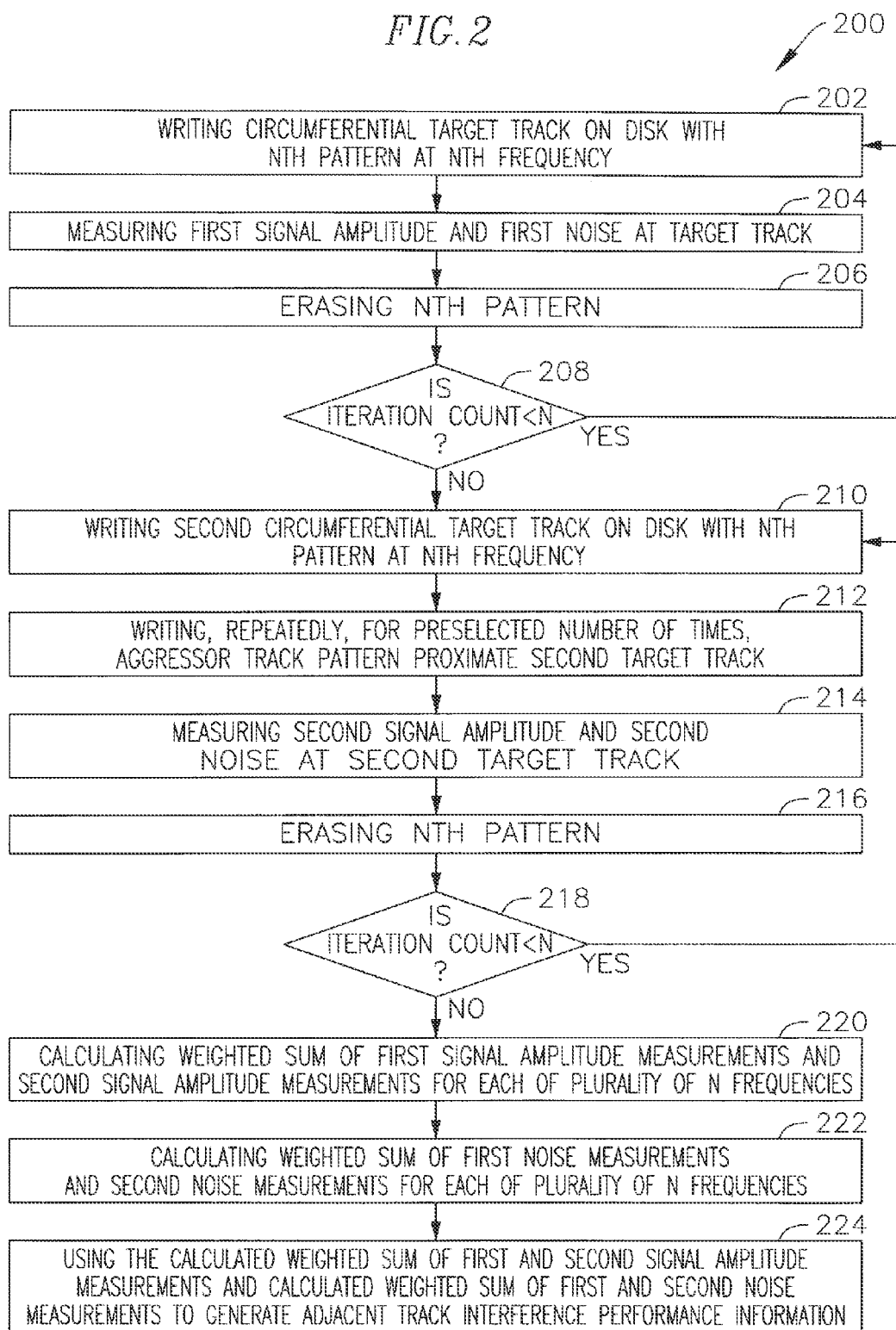
FIG. 2 is a flow chart of a process for measuring performance characteristics associated with adjacent track interference for multiple target tracks of a magnetic disk media, where the process calculates weighted sums of the performance characteristics at multiple frequencies in accordance with one embodiment of the invention.

FIG. 2 is a flow chart of a process 200 for measuring performance characteristics associated with adjacent track interference for multiple target tracks of a magnetic disk media, where the process calculates weighted sums of the performance characteristics at multiple frequencies in accordance with one embodiment of the invention. The process first writes (202) a circumferential target track on the disk with an nth pattern at an nth frequency. In several embodiments, n is a positive integer indicative of a preselected number of frequencies at which the process writes data. In one embodiment, n is 6. In other embodiments, n can be greater than or less than 6. The process then measures (204) a first signal amplitude and a first noise at the target track. The process erases (206) the nth pattern on the target track. The process determines (208) whether the iteration count is less than n. If so, the process returns to block 202 to write another target track at another frequency.

If the process determines that the iteration count is not less than n, the process writes (210) a second circumferential target track on the disk with an nth pattern at an nth frequency. The process then writes (212), repeatedly for a preselected number of times, an aggressor track pattern proximate the second target track. In some embodiments, the process writes the aggressor track pattern on one side of the target track. In other embodiments, the process writes the aggressor track pattern on both an inner side and an outer side of the target track. In one embodiment, the preselected number of times is 1 or 300. The process then measures (214) a second signal amplitude and a second noise at the second target track. The process erases (216) the nth pattern on the second target track. The process determines (218) whether the iteration count is less than n. If so, the process returns to block 210.

In some embodiments, the process repeats the actions of blocks 210-218 with different values for the preselected number of aggressor writes. In one embodiment, for example, the process repeats the actions of blocks 210-218 with the preselected number of aggressor writes equal to 1 and 300. In other embodiments, the process repeats with other suitable values for the preselected number of aggressor writes.

If the process determines that the iteration count is not less than n, the process calculates (220) a weighted sum of the first signal amplitude measurements and the second signal amplitude measurements for each of the plurality of n frequencies. The process then calculates (222) a weighted sum of the first noise measurements and the second noise measurements for each of the plurality of n frequencies. The process uses (224) the calculated weighted sum of the first and the second signal amplitude measurements and the calculated weighted sum of the first and the second noise measurements to generate adjacent track interference performance information.

In several embodiments, the adjacent track interference performance information is used to make improvements in the magnetic media or processes associated with use of the magnetic media. In some embodiments, the adjacent track interference performance information can be used to in place of other conventional measurements of error. In several embodiments, the adjacent track interference performance information can be more accurate other conventional measurements of error.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 3:
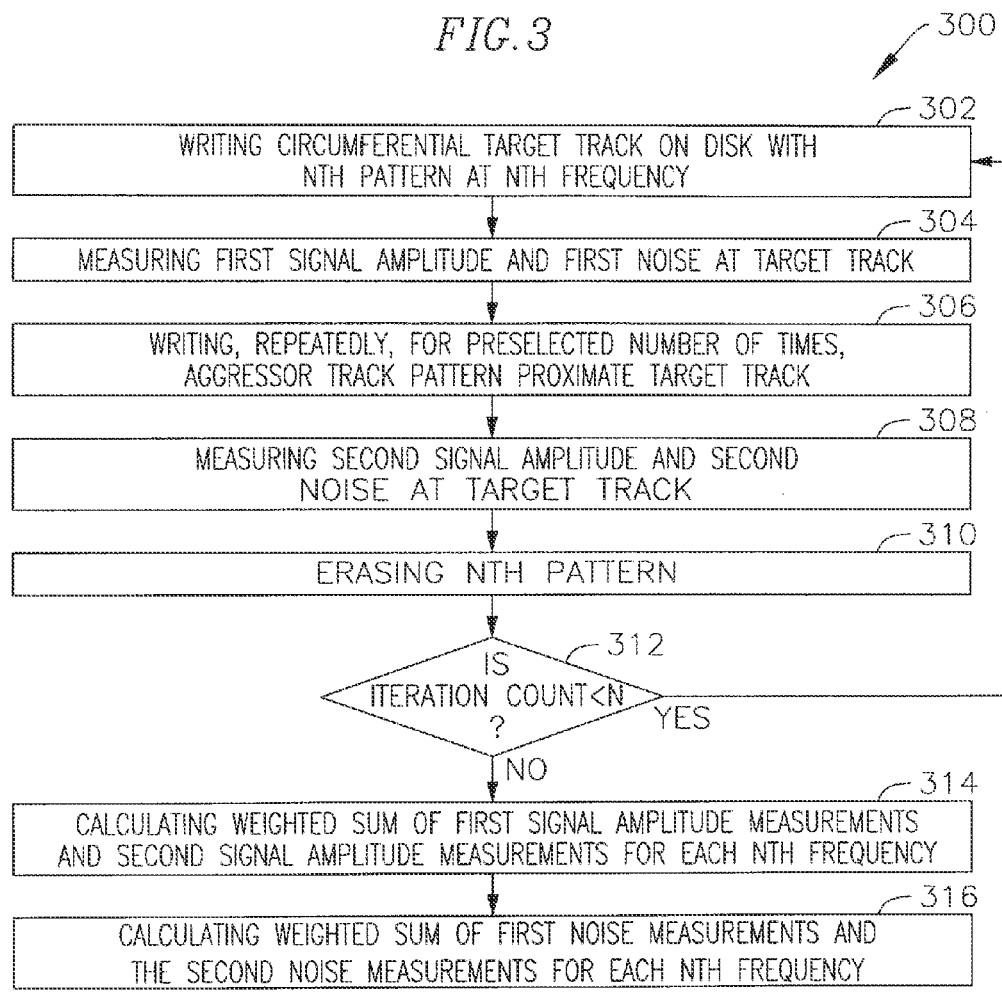
FIG. 3 is a flow chart of a second process for measuring performance characteristics associated with adjacent track interference for multiple target tracks of a magnetic disk media, where the process calculates weighted sums of the performance characteristics at multiple frequencies in accordance with one embodiment of the invention.

FIG. 3 is a flow chart of a second process 300 for measuring performance characteristics associated with adjacent track interference for multiple target tracks of a magnetic disk media, where the process calculates weighted sums of the performance characteristics at multiple frequencies in accordance with one embodiment of the invention. The process first writes (302) a circumferential target track on the disk with a nth pattern at an nth frequency. The process then measures (304) a first signal amplitude and a first noise at the target track. The process writes (306), repeatedly, for a preselected number of times, an aggressor track pattern proximate the target track. In one embodiment, the preselected number of times is 1. In another embodiment, the preselected number of times is 300. In other embodiments, the preselected number of times is another suitable positive integer. In some embodiments, the process writes the aggressor track pattern on one side of the target track. In other embodiments, the process writes the aggressor track pattern on both an inner side and an outer side of the target track.

The process then measures (308) a second signal amplitude and a second noise at the target track. The process erases (310) the nth pattern on the target track. The process then determines (312) whether the iteration count is less than n. If so, the process returns to block 302. If not, the process then calculates (314) a weighted sum of the first signal amplitude measurements and the second signal amplitude measurements for each nth frequency. The process then calculates (316) a weighted sum of the first noise measurements and the second noise measurements for each nth frequency.

In some embodiments, the process is executed with a preselected number of aggressor writes equal to 1 and subsequently with a preselected number of aggressor writes equal to 300. In such case, the process can provide measurement data for 0 aggressor writes, 1 aggressor write, and 300 aggressor writes. In other embodiments, the process can apply other numbers of preselected aggressive writes.

In several embodiments, adjacent track interference performance information is generated using the cumulative data. In such case, the adjacent track interference performance information can be used to make improvements in the magnetic media or processes associated with use of the magnetic media. In some embodiments, the adjacent track interference performance information can be used to in place of other conventional measurements of error. In several embodiments, the adjacent track interference performance information can be more accurate other conventional measurements of error.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 4:
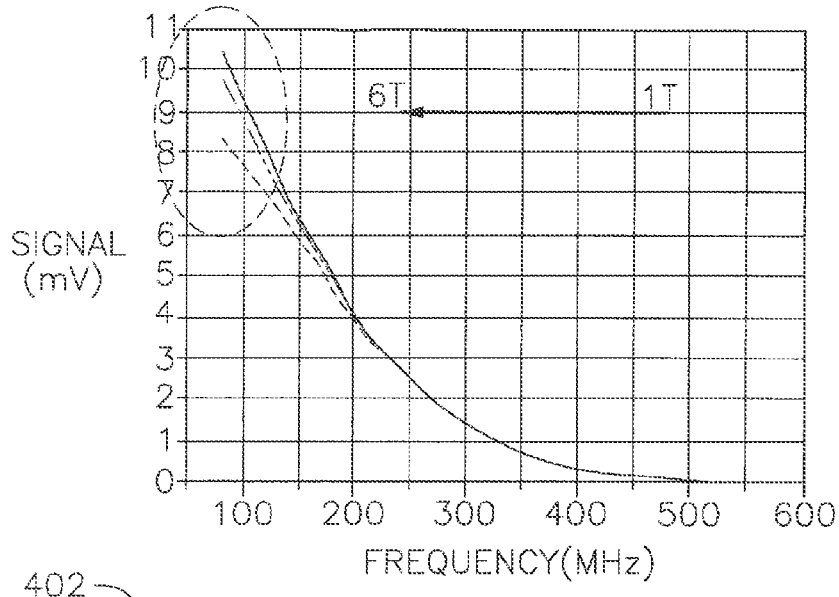
FIG. 4 is a graph of a measured signal magnitude versus frequency illustrating media performance for zero aggressive writes, 1 aggressive write, and 300 aggressive writes in accordance with one embodiment of the invention.

FIG. 4 is a graph 400 of a measured signal magnitude versus frequency illustrating media performance for zero aggressive writes (402), 1 aggressive write (404), and 300 aggressive writes (406) in accordance with one embodiment of the invention.

Figure 5:
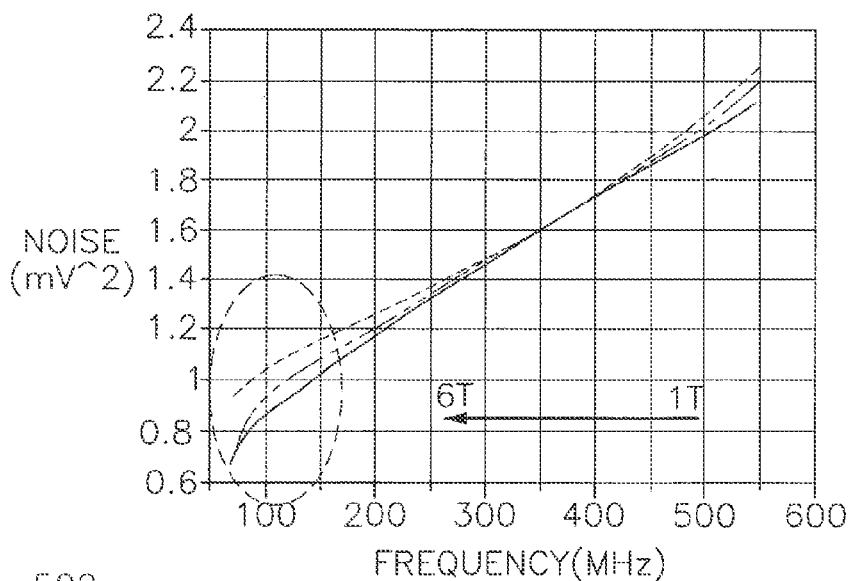
FIG. 5 is a graph of a measured noise versus frequency illustrating media performance for zero aggressive writes, 1 aggressive write, and 300 aggressive writes in accordance with one embodiment of the invention.

FIG. 5 is a graph 500 of a measured noise versus frequency illustrating media performance for zero aggressive writes (502), 1 aggressive write (504), and 300 aggressive writes (406) in accordance with one embodiment of the invention.

FIG. 6 is a graph 600 of a calculated signal to noise ratio (SNR) versus frequency illustrating media performance for zero aggressive writes (602), 1 aggressive write (604), and 300 aggressive writes (606) in accordance with one embodiment of the invention. In several embodiments, the calculated signal to noise ratio for graph 600 is derived from the signal measurements of FIG. 4 and the noise measurements of FIG. 5.

FIG. 7 is an expanded view 700 of a portion of the graph of FIG. 6 illustrating an extent of damage caused by adjacent track interference in accordance with one embodiment of the invention. The decrease in the SNR noted by the downward arrow, represented by the distance from the line indicative of the 0 aggressive writes to the line indicative of the 300 aggressive writes, is representative of the damage caused by adjacent track interference.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A method for measuring performance associated with adjacent track interference on a magnetic disk media for a storage device, the method comprising:
    iteratively measuring a first signal amplitude and a first noise at a target track for each of a plurality of n frequencies, wherein the iteratively measuring the first signal amplitude and the first noise for an ith iteration, where the ith is an iteration count extending from 1 to n and n is a positive integer, comprises:
        writing a circumferential target track on the disk with an nth pattern at an nth frequency,
        measuring a first signal amplitude and a first noise at the target track, and
        erasing the nth pattern from the circumferential target track;
    iteratively measuring a second signal amplitude and a second noise at a target track for each of the plurality of n frequencies, wherein iteratively measuring the second signal amplitude and the second noise for an jth iteration, where the jth is an iteration count extending from 1 to n, comprises:
        writing a second circumferential target track on the disk with an nth pattern at an nth frequency,
        writing, repeatedly for a preselected number of times, an aggressor track pattern proximate the second target track,
        measuring a second signal amplitude and a second noise at the second target track, and
        erasing the nth pattern from the second circumferential target track;
    calculating a weighted sum of the first signal amplitude measurements and the second signal amplitude measurements for each of the plurality of n frequencies;
    calculating a weighted sum of the first noise measurements and the second noise measurements for each of the plurality of n frequencies; and
    using the calculated weighted sum of the first and the second signal amplitude measurements and the calculated weighted sum of the first and the second noise measurements to generate adjacent track interference performance information.

2. The method of claim 1, wherein n is 6.

3. The method of claim 1, wherein the preselected number of times is 299.

4. The method of claim 1, wherein n is 6 and the weighted sum of the measured signal amplitude comprises:
    a weight for the first and second signal amplitude measurements of the first frequency of 0.25;
    a weight for the first and second signal amplitude measurements of the second frequency of 0.25;
    a weight for the first and second signal amplitude measurements of the third frequency of 0.1875;
    a weight for the first and second signal amplitude measurements of the fourth frequency of 0.125;
    a weight for the first and second signal amplitude measurements of the fifth frequency of 0.071825; and
    a weight for the first and second signal amplitude measurements of the sixth frequency of 0.046875.

5. The method of claim 1, wherein n is 6 and the weighted sum of the measured noise comprises:
    a weight for the first and second noise measurements of the first frequency of 0.25;
    a weight for the first and second noise measurements of the second frequency of 0.25;
    a weight for the first and second noise measurements of the third frequency of 0.1875;
    a weight for the first and second noise measurements of the fourth frequency of 0.125;
    a weight for the first and second noise measurements of the fifth frequency of 0.071825; and
    a weight for the first and second noise measurements of the sixth frequency of 0.046875.

6. The method of claim 1, further comprising modifying a media structure of the magnetic disk media based on the adjacent track interference performance information.

7. The method of claim 1, wherein the using the using the calculated weighted sum of the first and the second signal amplitude measurements and the calculated weighted sum of the first and the second noise measurements to generate the adjacent track interference performance information comprises:
    calculating a difference in successive signal amplitude measurements; and
    calculating a difference in successive noise measurements.

8. The method of claim 1, wherein the writing, repeatedly for the preselected number of times, the aggressor track pattern proximate the second target track comprises:
    writing, repeatedly for the preselected number of times, the aggressor track pattern proximate the second target track on a first side and a second side of the second target track.

9. A method for measuring performance associated with adjacent track interference on a magnetic disk media for a storage device, the method comprising:
    (a) writing a circumferential target track on the disk with an nth pattern at an nth frequency, wherein n is a positive integer;
    (b) measuring a first signal amplitude and a first noise at the target track;

(c) writing, repeatedly for a preselected number of times, an aggressor track pattern proximate the target track;

(d) measuring a second signal amplitude and a second noise at the target track;

(e) erasing the nth pattern;

(f) repeating (a)-(e) n times;

(g) calculating a weighted sum of the first signal amplitude measurements and the second signal amplitude measurements for each nth frequency; and (h) calculating a weighted sum of the first noise measurements and the second noise measurements for each nth frequency.

10. The method of claim 9, wherein n is 6.

11. The method of claim 9, wherein the preselected number of times is 299.

12. The method of claim 9, wherein n is 6 and the weighted sum of the measured signal amplitude comprises:

a weight for the first and second signal amplitude measurements of the first frequency of 0.25;

a weight for the first and second signal amplitude measurements of the second frequency of 0.25;

a weight for the first and second signal amplitude measurements of the third frequency of 0.1875;

a weight for the first and second signal amplitude measurements of the fourth frequency of 0.125;

a weight for the first and second signal amplitude measurements of the fifth frequency of 0.071825; and a weight for the first and second signal amplitude measurements of the sixth frequency of 0.046875.

13. The method of claim 9, wherein n is 6 and the weighted sum of the measured noise comprises:

a weight for the first and second noise measurements of the first frequency of 0.25;

a weight for the first and second noise measurements of the second frequency of 0.25;

a weight for the first and second noise measurements of the third frequency of 0.1875;

a weight for the first and second noise measurements of the fourth frequency of 0.125;

a weight for the first and second noise measurements of the fifth frequency of 0.071825; and a weight for the first and second noise measurements of the sixth frequency of 0.046875.

14. The method of claim 9, further comprising modifying a media structure of the magnetic disk media based on the calculated weighted sum of the first and the second signal amplitude measurements and the calculated weighted sum of the first and the second noise measurements.

15. The method of claim 9, wherein the writing, repeatedly for the preselected number of times, the aggressor track pattern proximate the target track comprises:

writing, repeatedly for the preselected number of times, the aggressor track pattern proximate the target track on a first side and a second side of the target track.

\* \* \* \* \*